US006378343B1

(12) United States Patent
Lee

(10) Patent No.: US 6,378,343 B1
(45) Date of Patent: Apr. 30, 2002

(54) LOCKING DEVICE FOR A STEERING WHEEL OF AN AUTOMOBILE

(76) Inventor: Miko Lee, 3 Fl., No. 649-5, Chung Cheng Rd., Hsin Chuang City, Taipei Hsien (TW)

( * ) Notice: Subject to any disclaimer, the term of this patent is extended or adjusted under 35 U.S.C. 154(b) by 0 days.

(21) Appl. No.: 09/794,535

(22) Filed: Feb. 27, 2001

(51) Int. Cl.$^7$ .............................................. B60R 25/10
(52) U.S. Cl. ........................................ 70/209; 70/226
(58) Field of Search ......................... 70/209–212, 225, 70/226, 237, 238

(56) References Cited

U.S. PATENT DOCUMENTS

| 5,095,723 A | * | 3/1992 | Lin ............................... 70/209 |
| 5,277,042 A | * | 1/1994 | Tobias .......................... 70/209 |
| 5,347,836 A | * | 9/1994 | Chen ............................ 70/209 |
| 5,375,441 A | * | 12/1994 | Liou ........................... 70/209 |
| 5,426,960 A | * | 6/1995 | Jan .............................. 70/209 |
| 5,457,972 A | * | 10/1995 | Lo ............................... 70/209 |
| 5,636,537 A | * | 6/1997 | Chen ............................ 70/209 |
| 5,921,120 A | * | 7/1999 | Wu ........................... 70/226 X |
| 5,924,315 A | * | 7/1999 | Chang ....................... 70/226 X |

FOREIGN PATENT DOCUMENTS

| AU | 72720/91 | * | 8/1991 | .................. 70/209 |
| AU | 81305/91 | * | 5/1992 | .................. 70/209 |

* cited by examiner

*Primary Examiner*—Suzanne Dino Barrett
(74) *Attorney, Agent, or Firm*—Hedman & Costigan, P.C.

(57) ABSTRACT

A locking device for a steering wheel of an automobile particularly consists of a body, a catch member being vertically movable in the body, and a moving rod being horizontally movable along a through hole defined in the body. A holding member is secured at a first end of the moving rod and corresponds to an opening of a holding portion formed in the body, and a retaining end portion formed at a second end of the moving rod. A nodal point of the steering wheel can be securely fitted in the holding portion and retained between the holding portion and the holding member in a locking status.

3 Claims, 5 Drawing Sheets

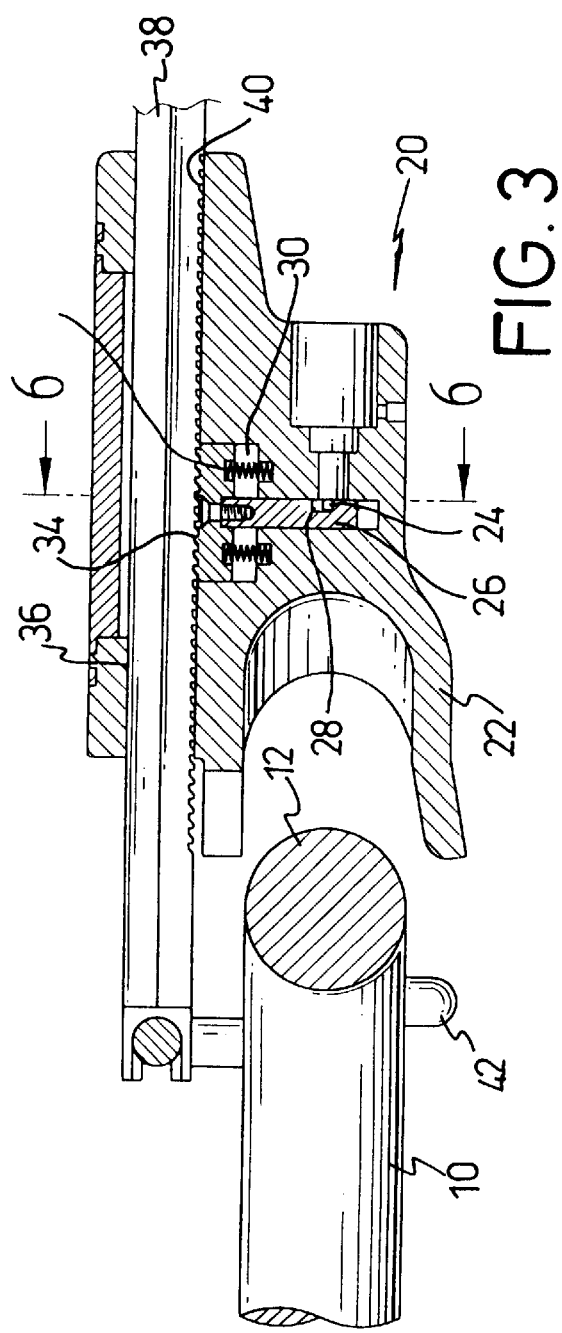
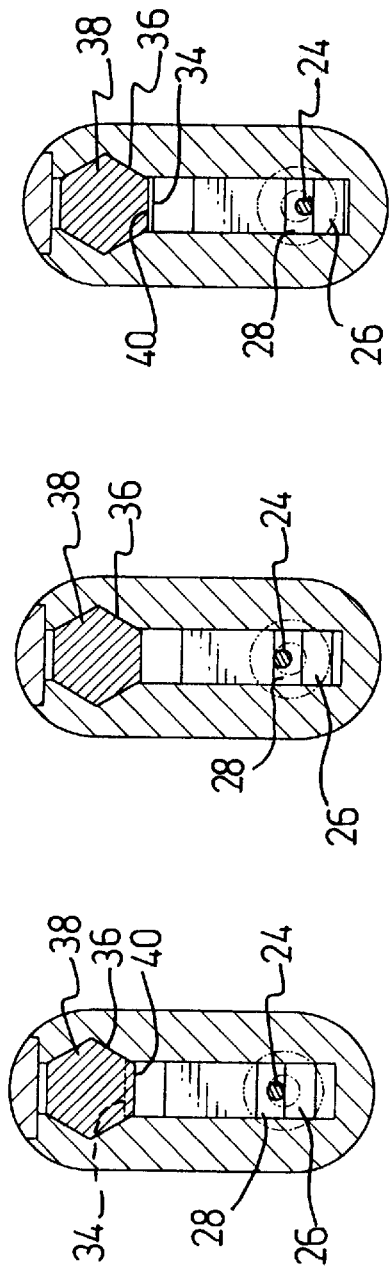

LOCKING DEVICE FOR A STEERING WHEEL OF AN AUTOMOBILE

BACKGROUND OF THE INVENTION

1. Field of the Invention

The present invention relates to a locking device which is particularly used to securely enclose a nodal point of a steering wheel of a vehicle in a locking status to prevent the steering wheel from being controllable by any unauthorized person.

2. Description of Related Art

Along with the automobile becoming a more and more important daily transportation vehicle now, various locking devices, such as locking devices for steering wheels, locking devices for gear change levers and locking devices for brakes, etc., have been devised in accordance with demand for prevention of theft.

The conventional locking devices of steering wheels sold on the market normally comprise a fork shaped body portion securely enclosing a wheel rim of a steering wheel, and a retaining rod extended outwards from the body portion. When an unauthorized person tries to steal an automobile, if the steering wheel is secured with the locking device, the retaining rod will be turned to abut a window of the automobile and thus the vehicle cannot be unauthorizedly driven away. However, the conventional locking device for a steering wheel has a defect which is that if a section of the wheel rim enclosed in the locking device is cut away, then the locking device with the section of the wheel rim can be removed and separated from the steering wheel, and the steering wheel will be still operable.

Therefore, it is an objective of the invention to provide an improved locking device for a steering wheel of an automobile to mitigate and/or obviate the aforementioned problems.

SUMMARY OF THE INVENTION

The main object of the present invention is to provide a locking device, which is used to securely enclose a nodal point of a steering wheel in a locking status. Even if a thief cuts away one section of a wheel rim of the steering wheel, as this section is integrally formed with a wheel arm at the nodal point, the locking device securely enclosing the nodal point is still not separable from the steering wheel, and thus the thief is thwarted.

Other objects, advantages and novel features of the invention will become more apparent from the following detailed description when taken in conjunction with the accompanying drawings.

BRIEF DESCRIPTION OF THE DRAWINGS

FIG. 3 is a side cross sectional view of the locking device and the steering wheel in the unlocking status in accordance with the invention;

FIG. 6 is a first cross sectional view of the locking device in accordance with the invention, showing a T-shaped catch member in an upper position in operation;

FIG. 7 is a second cross sectional view of the locking device in accordance with the invention showing the T-shaped catch member in a lower position in operation; and FIG. 8 is a third cross sectional view of the locking device in accordance with the invention showing the T-shaped catch member fixedly retained by an eccentric shaft in the lower position.

DETAILED DESCRIPTION OF THE PREFERRED EMBODIMENT

Figure 1:
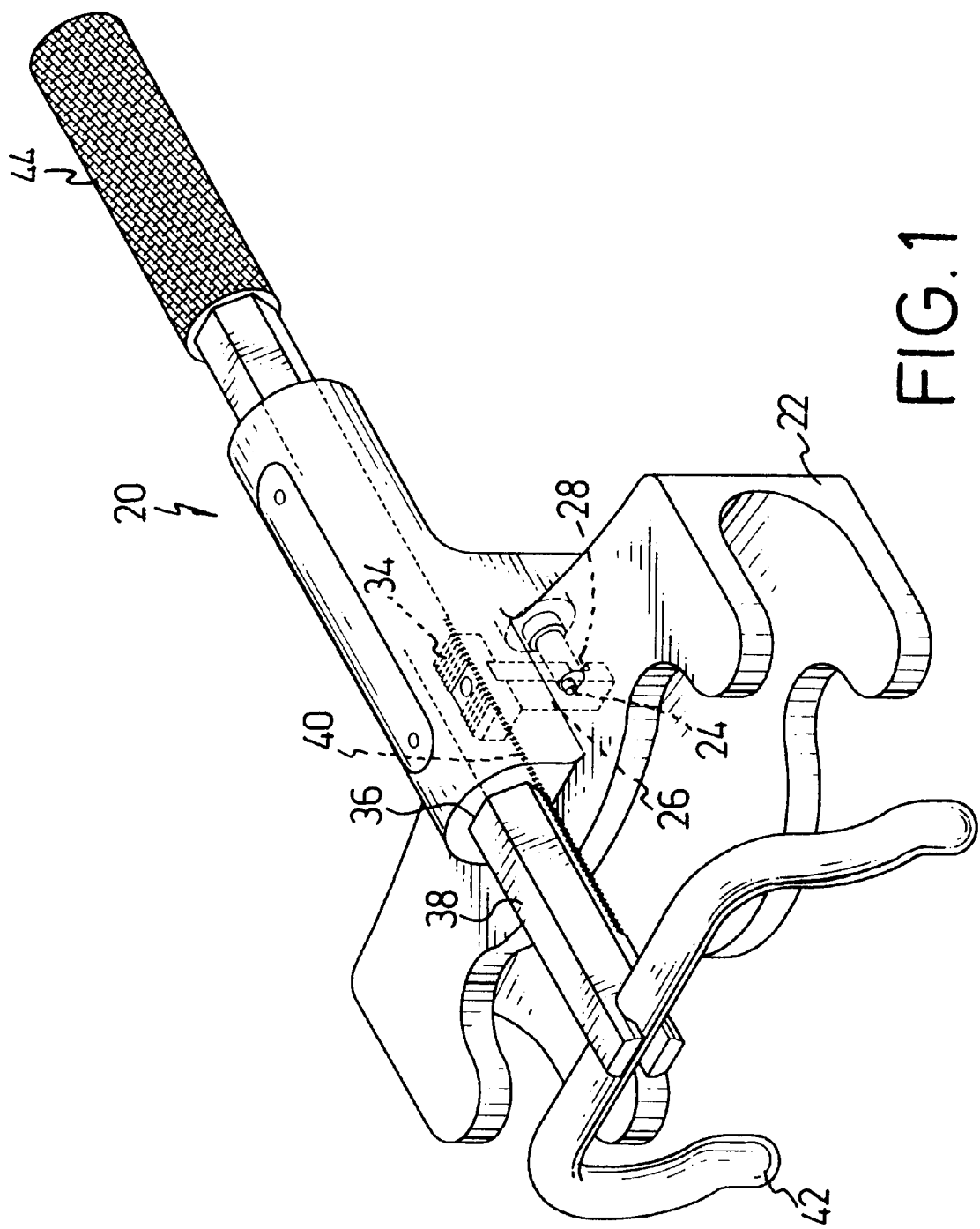
FIG. 1 is a perspective view of a locking device for a steering wheel in accordance with the invention.
Figure 2:
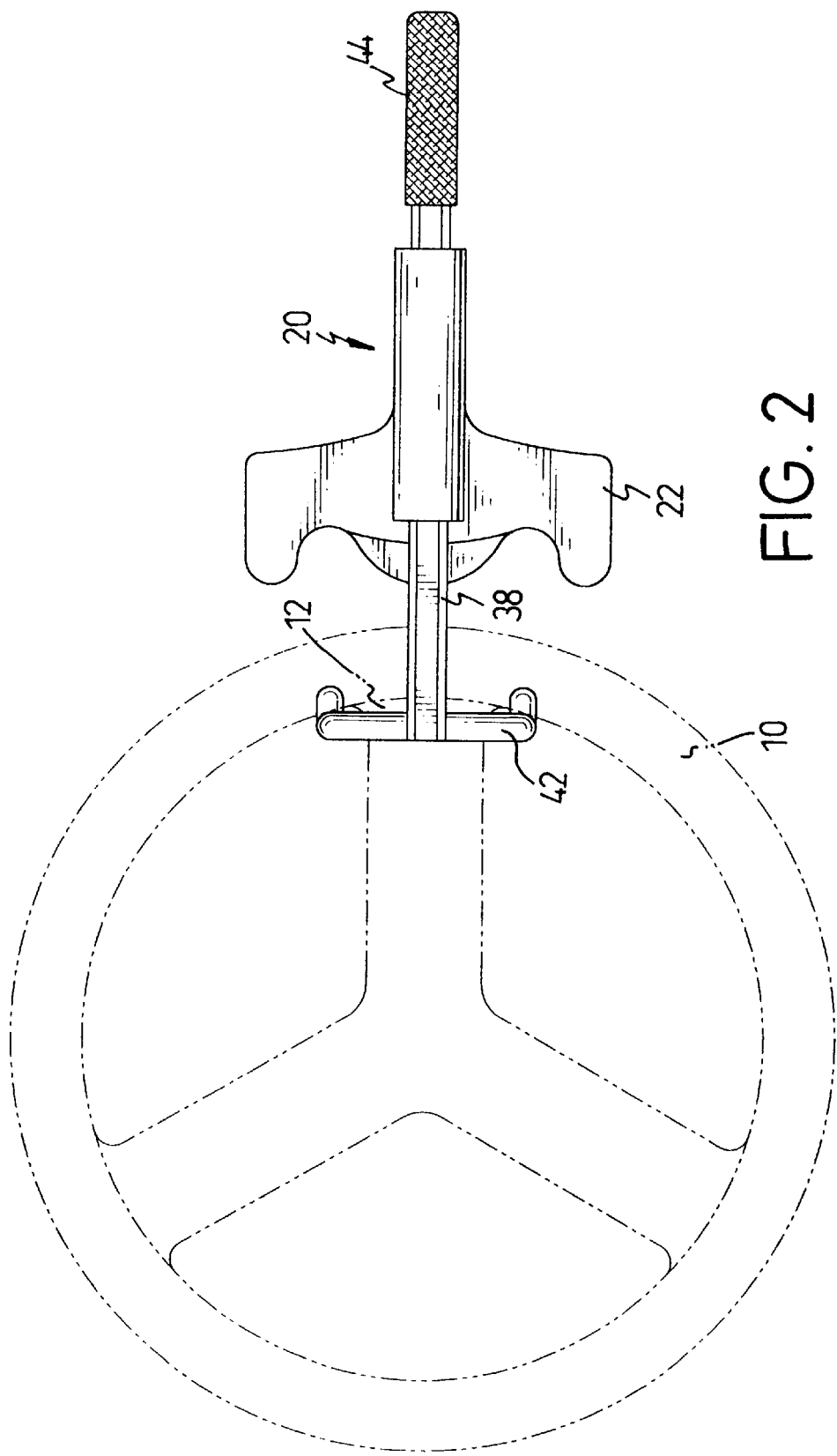
FIG. 2 is a plan view of the locking device and the steering wheel in an unlocking status in accordance with the invention.

As shown in FIGS. 1, 2 and 3, the present invention relates to a locking device used to enclose a steering wheel (10) at its nodal point (12) in a locking status. The locking device comprises a body (20) integrally formed with a holding portion (22), which is formed with a reversed C-shaped cross section corresponding to the shape of a wheel rim of the steering wheel (10) to receive the wheel rim fitted therein from an opening of the holding portion (22).

The locking device further has an eccentric shaft (24) fitted in the body (20), and a T-shaped catch member (26) movable in a vertical direction in a T-shaped receiving space (30) defined in the body (20). The eccentric shaft (24) controlled by an operator via a key has an end thereof inserted into a slot (28) defined in one side of the T-shaped catch member (26). An upper end surface of the T-shaped catch member (26) has ratchet teeth (34) formed thereon.

A moving rod (38) is movably in a horizontal direction along a though hole (36) defined in the body (20). As one practicable embodiment, the moving rod (38) as shown in the appended drawings is formed with a polygonal cross section. A lower end surface of the moving rod (38) has a ratchet bar (40) formed along a longitudinal direction thereof corresponding to the ratchet teeth (34) of the T-shaped catch member (26). A plurality of springs (32) is provided between the T-shaped receiving space (30) and the T-shaped catch member (26) to press the T-shaped catch member (26) upwardly to abut against the lower end surface of the moving rod (38). A first end of the moving rod (38) is secured at a center of a U-shaped holding member (42) corresponding to the opening of the holding portion (22). A second end of the moving rod (38) is formed as a retaining end portion (44). The U-shaped holding member (42) has two opposite ends adapted to respectively contact against an inner side of the wheel rim at two opposite sides of the nodal point (12).

Figure 4:
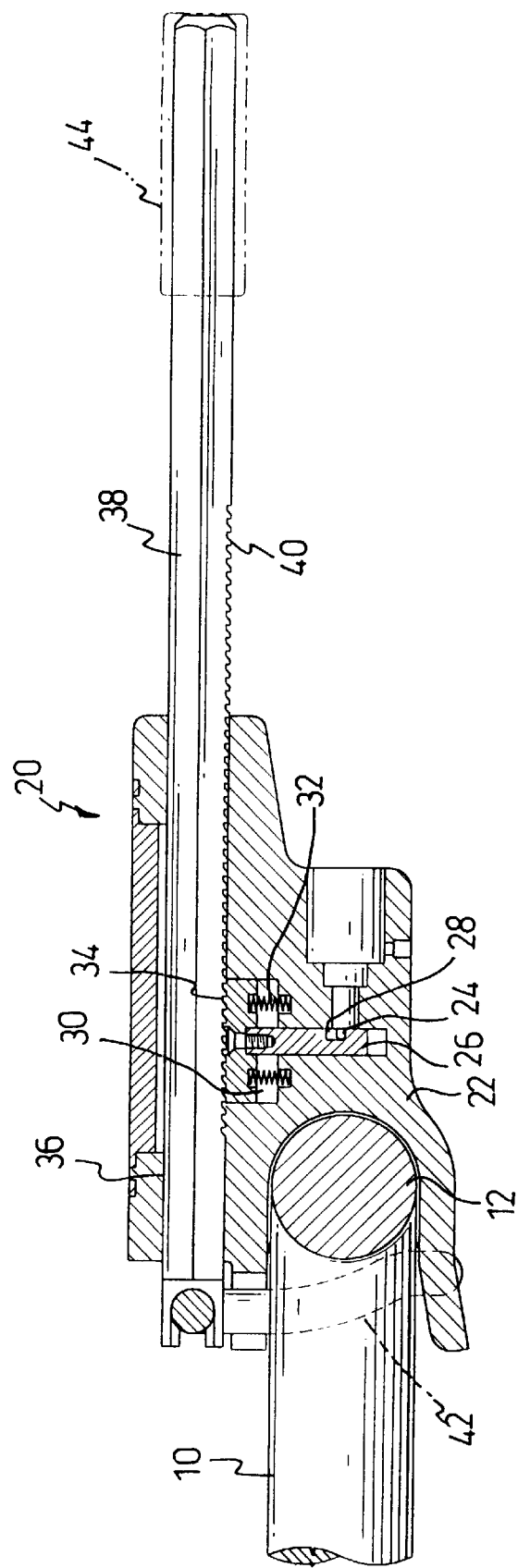
FIG. 4 is a side cross sectional view of the locking device enclosing the steering wheel in a locking status in accordance with the invention.
Figure 5:
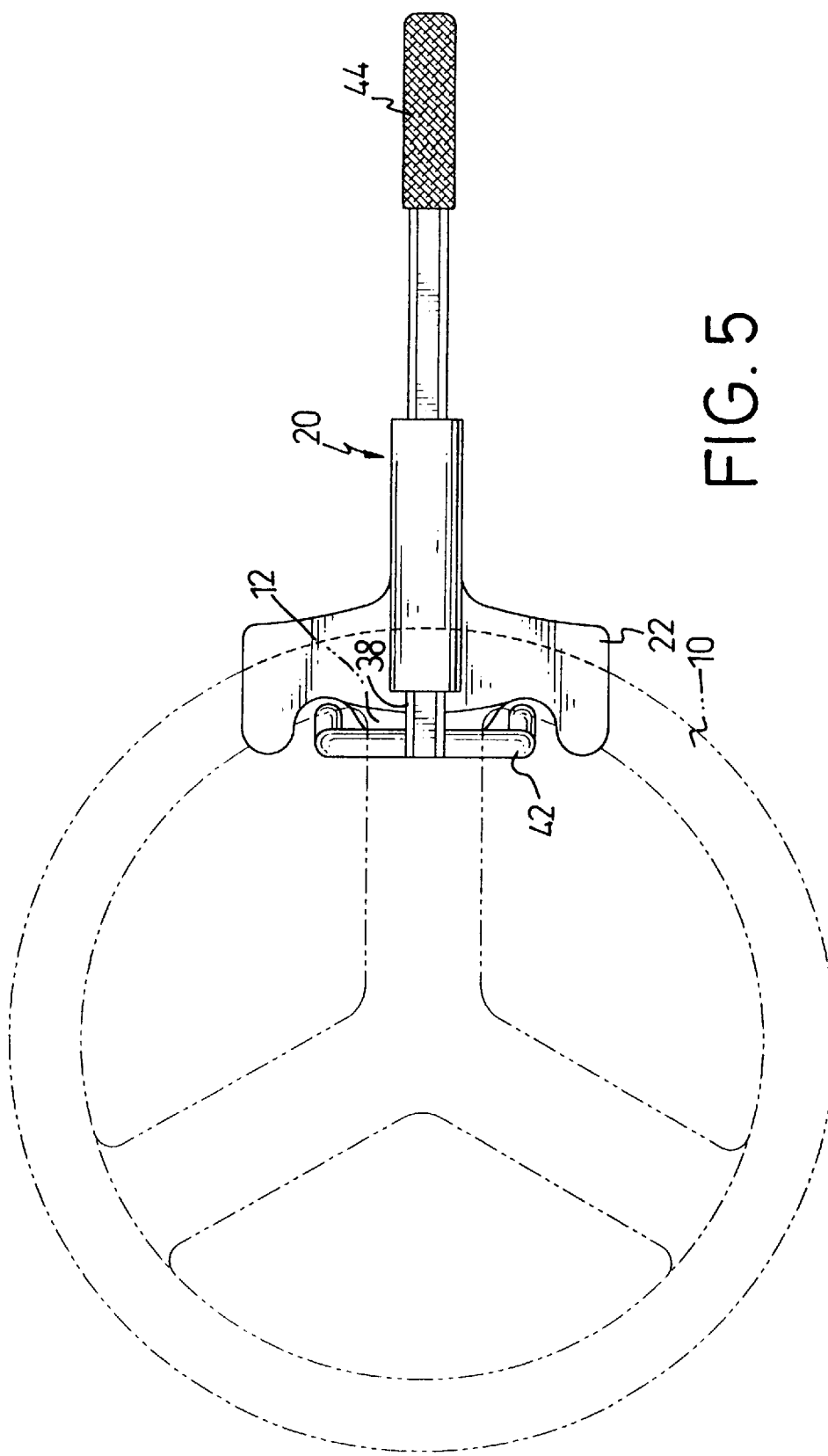
FIG. 5 is a plan view of the locking device in a locking status on the steering wheel in accordance with the present invention.

As shown in FIGS. 4 and 5, when the holding member (42) is arranged to abut against the inner side of the wheel rim at two opposite sides of the nodal point (12), the body (20) can be pressed to move towards the holding member (42) till the nodal point (12) of the steering wheel (10) is wholly fitted in the holding portion (22) and [???] between the holding portion (22) and the holding member (42). Because teeth of the ratchet bar (40) of the moving rod (38) have an opposite direction to that the ratchet teeth (34) of the T-shaped catch member (26), the body (20) can be moved relative to the moving rod (38) in only one direction such that the holding portion (22) moves closer to the holding member (42). While the body (20) is moving towards the holding member (42), the T-shaped catch member (26) is constantly shifted in the T-shaped receiving space (30) between an upper position in which, as shown in FIG. 6, the ratchet teeth (34) of the T-shaped catch member (26) are engaged with the ratchet bar (40) of the moving rod (38), and a lower position in which, as shown in FIG. 7, the ratchet teeth (34) of the T-shaped catch member (26) are disengaged with the ratchet bar (40) of the moving rod (38). In the meanwhile, the eccentric shaft (24) is also shifted in the slot (28) between a lower position shown in FIG. 6, and an upper position shown in FIG. 7.

However, only when the T-shaped catch member (26) is fixedly retained by the eccentric shaft (24) at the lower position in which, as shown in FIG. 8, the ratchet teeth (34) are disengaged with the ratchet bar (40), can the body (20) be removed in a reversed direction towards the retaining end portion (44) of the moving rod (38). Then the steering wheel (10) can be released from the opening of the holding portion (22).

Because the holding member (42) has two opposite ends thereof respectively pressing against an inner side of the steering wheel (10) at two opposite sides of the nodal point (12), if a section of the wheel rim enclosed in the holding portion (22) of the locking device is cut away, the section of the wheel rim is still connected with a wheel arm of the steering wheel (10) at the nodal point (12), and the locking device is still securely attached to the steering wheel. From the above description, the locking device of the present invention has an improved structure to prevent any intended theft.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A locking device for steering wheel comprising:

a body integrally formed with a C-shaped holding portion and having an opening defined at one side thereof;

a T-shaped catch member vertically movable in a T-shaped receiving space defined in the body, and having ratchet teeth formed on an upper end surface of the T-shaped catch member and wherein the T-shaped catch member is defined with a slot at one side thereof, an eccentric shaft has one end movably inserted in the slot, a plurality of springs is provided between the T-Shaped catch member and the T-shaped receiving space, whereby while the body moves along the moving rod towards the holding member, the T-shaped catch member is constantly shifted in the T-shaped receiving space between an upper position in which the ratchet teeth are engaged with the ratchet bar, and a lower position in which the ratchet teeth are disengaged with the ratchet bar, and when the T-shaped catch member is fixedly retained by the eccentric shaft at the lower position, the body is movable along the moving rod towards the retaining end portion;

a moving rod horizontally extending along a through hole defined in the body and having a lower end surface of the moving rod formed with a ratchet bar corresponding to the ratchet teeth of the T-shaped catch member;

a holding member secured at a first end of the moving rod corresponding to the opening of the holding portion; and a retaining end portion formed at a second end of the moving rod;

wherein the teeth of the ratchet bar of the moving rod have an inverted direction to the ratchet teeth of the T-shaped catch member.

2. The locking device for a steering wheel as claimed in claim 1, wherein the holding member (42) is a U-shaped member.

3. The locking device for a steering wheel as claimed in claim 1, wherein the moving rod (38) is formed with a polygonal cross section.

\* \* \* \* \*